UNITED STATES PATENT OFFICE.

HENRY KNIGHT, OF LIVERPOOL, ENGLAND, ASSIGNOR TO THOMAS GRIFFITHS, OF SAME PLACE.

IMPROVEMENT IN THE MANUFACTURE OF WHITE PIGMENTS.

Specification forming part of Letters Patent No. 212,017, dated February 4, 1879; application filed February 23, 1878.

*To all whom it may concern:*

Be it known that I, HENRY KNIGHT, of Liverpool, in the county of Lancaster, England, have invented an Improvement in the Manufacture of Pigments, of which the following is a specification:

My invention consists of a new method or process of manufacturing pigment, and of the resulting mixture or compound, all of which will be fully understood by the following description.

I take the native sulphate of baryta and mix the same with the sulphide of zinc, in the proportion of about sixty-two parts of sulphate of baryta to twenty-one parts of sulphide of zinc, and grind the mixture in water to an impalpable powder. To this mixture I add, say, seventeen parts of carbonate of magnesia, and calcine the whole at dull-red heat, excluding the air by a close chamber or the use of nitrogen or other neutral gas, as is well understood by chemists. This calcined mixture, while at red heat, is plunged into water, and afterward dried and triturated, thus forming my improved pigment, which consists of a mixture of sulphate of baryta and the oxides of zinc and of magnesium.

I do not claim the separate steps of the chemical process or any of the ingredients.

Having described my invention, I claim—

1. The above-described method or process of grinding a mixture of sulphate of baryta and sulphide of zinc, and then mixing the same with carbonate of magnesia, and calcining this mixture while air is excluded, in the manner described, and then plunging the hot mixture into water, and finally drying and triturating the same, substantially as set forth.

2. The composition of matter herein described, the same being a white powder or pigment, consisting of sulphate of baryta with the oxides of zinc and of magnesium.

HENRY KNIGHT.

Witnesses:
WM. P. THOMPSON,
J. HAYES.